April 7, 1970  P. J. DONALD  3,504,609
OPTICAL DATA SELECTION AND DISPLAY
Filed July 26, 1967  2 Sheets-Sheet 1
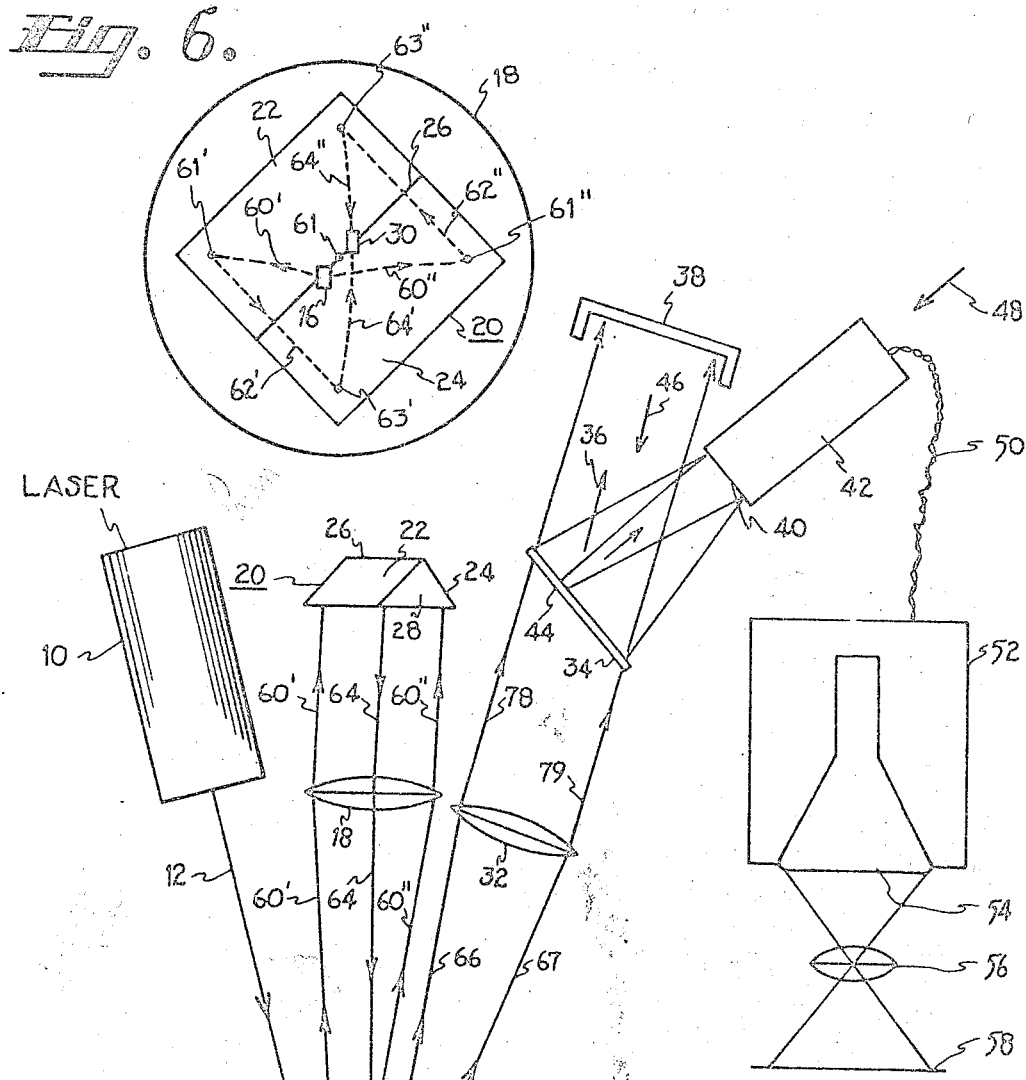
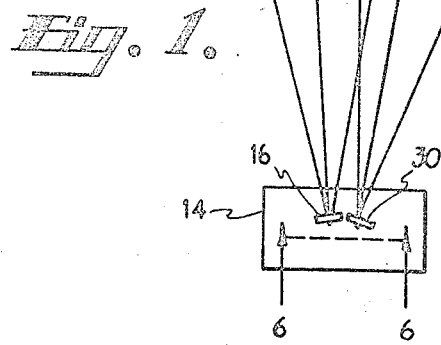
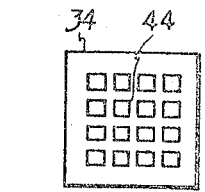
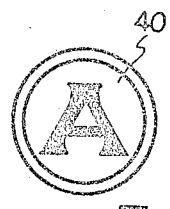
INVENTOR
PHILIP J. DONALD
BY Karl V. Olson
ATTORNEY

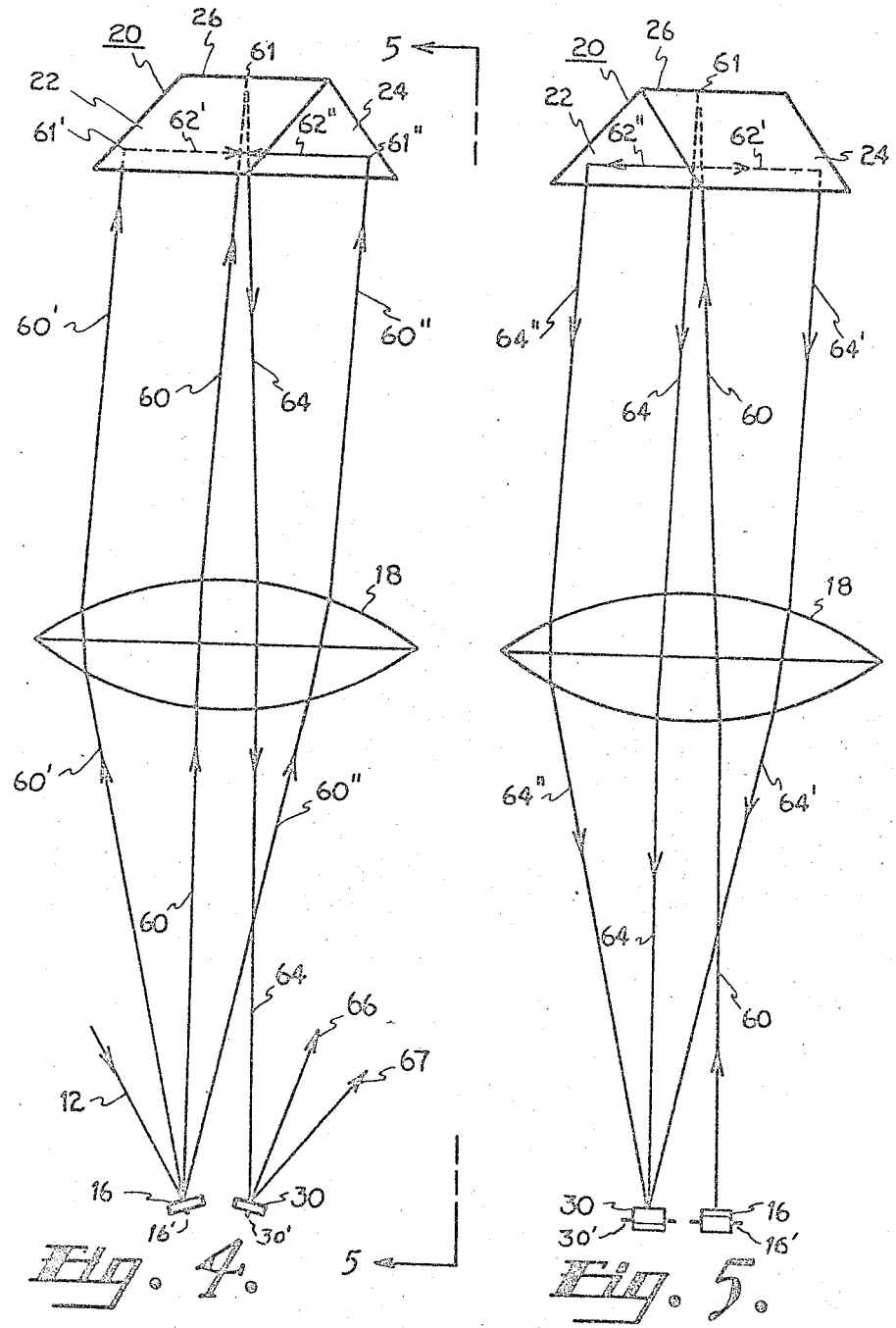

United States Patent Office 3,504,609
Patented Apr. 7, 1970

3,504,609
OPTICAL DATA SELECTION AND DISPLAY
Philip J. Donald, Woodbury, N.J., assignor to RCA Corporation, a corporation of Delaware
Filed July 26, 1967, Ser. No. 656,143
Int. Cl. B41b; G08b 23/00; G02f 1/34
U.S. Cl. 95—4.5
8 Claims

ABSTRACT OF THE DISCLOSURE

An optical data selection and display system for use in a photocomposing apparatus or the like. An image of any selected one of many alphanumeric, graphic, or digital characters is created and displayed at a fixed location in space. A laser beam source directs a light beam through a path including, in the order named, a first rotatable sector-sweeping galvanometer mirror, a condensing lens, a right-angle deflection-rotating prism, back through said condensing lens, a second rotatable sector-sweeping galvanometer mirror, and a hologram matrix of individual character-representing holograms arranged in rows and columns, whereby the laser beam can be horizontally and vertically deflected to any selected character-representing hologram of the hologram matrix. The illumination of any one of the holograms causes the creation of a corresponding graphic character at a common utilization location.

BACKGROUND OF THE INVENTION

A number of opto-electronic photocomposing or phototypesetting systems have been proposed to replace the linotype machines which have been almost universely employed. The composing process basically involves the repeated selection of any desired one of many alphanumatic characters in any one of a plurality of fonts, and the positioning of the selected character in an appropriate place along a line. One successful prior art photocomposing system includes a computer having a random-access core memory storing binary information from which any desired alphanumatic character can be created by a scanning motion on the phosphor screen face of a cathode ray tube. The deflection system of the cathode ray tube permits the selected character to be positioned at any desired point along a line on the face of the tube. The alphanumeric characters thus produced on the face of the cathode ray tube are imaged on a photographic film which, after development, is used to make a photoengraved printing plate. A number of other photocomposing systems have been proposed utilizing various combinations of mechanical, optical and electronic components. However, all of the existing and proposed photocomposing systems leave something to be desired in regards to cost, speed of operation, or practical feasibility. It is therefore a general object of this invention to provide an improved optical data selection and display system which is economical to construct and operate, which is fast in operation, and which is capable of implementation with presently-existing elemental component parts.

BRIEF SUMMARY OF THE INVENTION

In accordance with an example of the invention, a laser beam is directed to a first rotatable galvanometer-type mirror which gives the beam any desired amount of horizontal deflection. The beam is then directed through a condensing or collimating lens to a right-angle prism which translates the horizontal deflection to vertical deflection and returns the beam through the condensing lens to a second galvanometer mirror. The second galvanometer mirror adds any desired horizontal deflection on the existing vertical deflection. The two galvanometer mirrors are mounted side-by-side with parallel axes of rotation and with effective mirror surfaces displaced along a 45-degree diagonal relative to the axes of rotation. The right-angle prism is mounted with its axis parallel to the 45-degree diagonal. The horizontally and vertically deflected beam is made to illuminate any one of many character-representing holograms on a matrix of holograms arranged in rows and columns. A utilization device, such as an image orthicon, is positioned to receive the read image of the alphanumeric character stored in the illuminated hologram. The electrical output of the image orthicon may be applied to a cathode ray tube having a face on which the character is reproduced at any desired point along a line, and from which the character may be imaged on a photographic film.

BRIEF DESCRIPTION OF DRAWINGS

FIG. 1 is a plan view of an optical data selection and display system constructed according to the teachings of this invention;

FIG. 2 is a representation of a hologram matrix including a number of character-representing individual holograms arranged in rows and columns;

FIG. 3 is a representation of the image of a character created from one of the holograms in the matrix of FIG. 2 as presented to a display or utilization device;

FIG. 4 is a plan view of a portion of the optical system of FIG. 1 which will be referred to in describing the operation of the system;

FIG. 5 is a side view of the portion of the optical system shown in FIG. 4; and

FIG. 6 is an end view of a portion of the optical system of FIG. 1 which will be referred to in describing the operation of the system.

DETAILED DESCRIPTION

Referring now in greater detail to the system of FIG. 1, there is shown a laser 10 for emitting an intense light beam along a path 12 to a rotatable mirror 16 in a mirror galvanometer unit 14. The laser 10 may conveniently be conventional gas laser producing a continuous output light beam having a cross sectional diameter, where utilized in the system, of about 75 milli-inches and having a wavelength such as the 6328 angstrom wavelength of a helium neon gas laser. The term "laser beam" as used herein is intended to mean a relatively very intense beam of light (1) having a sufficient narrow spectral band of frequencies (temporal coherence), and (2) being capable of being imaged to an appropriately small spot (spatial coherence), so as to be suitable for use with holograms. The beam should have at least as small a cross sectional area as the rotatable mirror 16 at its point of incidence thereon.

The laser beam 12 is directed to the rotatable galvanometer mirror 16 in galvanometer unit 14 from which the beam is deflected through a condensing lens 18 to a right-angle deflection-rotating prism 20. The rotatable mirror or galvanometer mirror 16 is a plane mirror about 16 milli-inches square mounted for rotation about a vertical axis to deflect the laser beam 12 to any desired amount in a horizontal plane within a sector bounded by limits 60′ and 60″. The condensing lens 18 is positioned at a distance from the galvantometer mirror 16 equal to the focal length of the lens. Therefore, the light beam originating at the mirror 16 and entering the condensing lens 18 is passed through the lens along one of many corresponding parallel-extending paths, between the limits 60′ and 60″, to the prism 20.

The galvanometer mirror 16 is made to rotate about its vertical axis to any desired position by means of a conventional rotatably-mounted coil to which is supplied a deflection voltage having an amplitude corresponding with any desired angular position of the mirror. The galvanometer unit 14 may be a conventional commercially-available unit, and as such it is not necessary to describe it here in further detail.

The prism 20 includes two reflecting surfaces 22 and 24 arranged at right angles with each other and having an intersecting edge or axis 26. The word "prism" is used herein to describe the two orthogonal reflecting surfaces 22 and 24, which are all that is required in the invention, and which may be implemented without the intervening supporting glass at 28. The prism 20 is oriented with its corner axis 26 disposed along a 45-degree diagonal (relative to the mirror axes) to cause a horizontally-deflected incident beam to be translated to a vertically-deflected reflected beam, as will later be described in greater detail.

The return beam reflected from the prism 20 lies in vertical planes 64 passing through the condensing lens 18 to a second rotatable or galvanometer mirror 30 in the galvanometer unit 14. The second galvanometer mirror 30 is like the first mirror 16, and is mounted for rotation about a vertical axis parallel to the axis of mirror 16. The beam approaching and impinging on the central area of the second mirror 30 includes a vertical component of deflection which remains in the beam reflected from the second mirror 30. The mirror 30 adds a horizontal deflection to the beam in reflecting the beam to a second condensing lens 32 along a path between vertical plane limits 66 ad 67. A beam passing through the lens 32 follows a collimated path, in an area of rectangular cross section vertically bounded by lines 78 and 79, to and through a hologram matrix 34. The light passing directly through any individual hologram such as 44 of the matrix 34 along a path such as path 36 is not used, but rather is absorbed in a light absorbing baffle 38.

The beam passing through any selected individual hologram in the matrix 34 results in the imaging of a corresponding alphanumeric character in a plane 40, where there is positioned a display device or the image-receiving face of an image-utilizing device 42 such as a "vidicon," an "image orthocon," a "plumbicon" or a "sicon." The hologram matrix 34 seen on edge in FIG. 1 may in plan view be as shown in FIG. 2. The matrix 34 includes a number of individual character-representing holograms arranged in rows and columns. One of the individual holograms is illuminated at any one time by a beam from the laser 10 and the intervening optical elements. If the individual hologram 44 is illuminated, the alphanumeric character photographically stored in the hologram is recreated or reproduced as an optical image at the image-utilizing plane 40. The image at 40 will normally be the image of a single alphanumeric character occupying the entire image plane 40, as shown in FIG. 3.

The hologram matrix 34 is initially constructed by positioning a photographic plate at the position of matrix 34 in FIG. 1. Means (not shown) are arranged to project light onto the hologram film in a direction 46, and simultaneously in about a 30-degree-displaced direction 48 normal to the hologram film 34. The light from the two directions 46 and 48 is preferably supplied with the aid of a mirror (not shown) from a single laser source. In place of the utilization device 42, a single graphic character, such as is shown in FIG. 3, is positioned in the plane 40 in the path of light from the direction 48. A diffusing plate and a mask are positioned on the side of the hologram film 34 to which the light is supplied. An individual hologram is thus recorded on an elemental unmasked area on the hologram film. By successively positioning graphic characters at 40, and repositioning the mask, a complete matrix of holograms is recorded in rows and columns on the hologram film 34 as shown in FIG. 2. The hologram matrix film is then photographically developed and later used at 34 in reconstructing the graphic characters recorded thereon. Further information on holograms is contained in an article entitled "Photography by Laser" by E. N. Leith and J. Upatnick appearing in the June 1965, issue of Scientific American, pp. 24–35.

In the system of FIG. 1 the graphic character imaged at 40 may be translated by a conventional vidicon or image orthocon unit 42 to an electrical signal having time-scan variations in amplitude representing the graphic character. The electrical signal is connected through an electrical cable 50 to a cathode ray tube display device 52. The electrical signal supplied to the cathode ray tube device 52 is translated to a graphic image of the character on the viewing face 54 of a cathode ray tube. The position on the face 54 of each character is controlled by an electrical deflection system so that successive characters are displayed at spaced points along a line, from which they are imaged by a lens 56 to a corresponding location on a photographic film 58. The deflection system in the cathode ray device 52 may also alter the proportions of the graphic character to produce italic, bold face and other desired variations of the hologram character. The photographic film, after being exposed, is photographically developed and subsequently used for the preparation of a photoengraved printing plate.

Reference is now made to FIGS. 4, 5 and 6 for a more detailed description of the operation of the rotatable, sector-sweeping galvanometer mirrors 16 and 30, the condensing lens 18 and the prism 20 in providing a two-dimensional scanning of the incident beam from the laser 10 to any selected area of the rectangular hologram matrix 34. FIG. 4 is an enlarged plan view of the central portion of the optical system of FIG. 1. FIG. 5 is a side view looking in the direction 5—5 in FIG. 4. FIG. 6 is an end view looking in the direction 6—6 in FIG. 1. The rotatable galvanometer mirrors 16 and 30 are mounted side-by-side with parallel axes of rotation 16' and 30' (FIG. 5) and with effective mirror surfaces displaced along a 45-degree diagonal which is parallel to the corner axis 26 of the prism 20.

The laser beam 12 from laser 10 is reflected by the rotatable galvanometer mirror 16 towards condensing lens 18 and prism 20 along any one of a family of paths lying in the horizontal plane of the paper in FIGS. 1 and 4 between the sector limits 60' and 60". If the rotatable mirror 16 is in an intermediate position, the beam follows the path 60 to the point 61 in the corner of the prism 20 from which it is reflected (as though a vertical plane mirror were at point 61) back along the path 64 through the condensing lens 18 to a central position on the second rotatable galvanometer mirror 30.

On the other hand, if the first rotatable mirror 16 is positioned to reflect the incident beam 12 along the deflected path 60', the beam strikes the prism mirror surface 22 at point 61' from which it is reflected along a path 62' to a point 63' on the prism mirror surface 24 (FIG. 6). The beam is then reflected back along the path 64' through the condensing lens 18 to the central region of the second rotatable mirror 30. The path 64' is below the path 64 shown in FIG. 4, as shown in the side view of FIG. 5. When the first rotatable mirror 16 is positioned to reflect the beam 12 along the other extreme deflection path 60", the beam follows the course including points 61" on prism mirror 24, path 62", point 63" on prism mirror 22 and back along path 64" to the second rotatable mirror 30. The return path 64" is above the return path 64 in FIG. 4, as shown in the side view of FIG. 5.

To summarize, the incident beam 12 is deflected by rotatable mirror 16 any desired amount in the horizontal direction as shown in FIG. 4. The prism 20 translates the amount of horizontal deflection imparted by the rotatable mirror 16 to a corresponding amount of vertical deflection within the bounds of lines 64' and 64" in FIG. 5. The beam returning through the condensing lens 18, regardless of the amount of its vertical deflection, is directed to the central region of the second rotatable mirror 30. The second rotatable mirror 30 then adds a desired amount of horizontal deflection to the already vertically-deflected incident beam. The beam reflected from the rotatable mirror 30 is thus deflected any desired amount in both the horizontal and vertical directions. The horizontal and vertically deflected beam from rotatable mirror 30 passes through any desired elemental area in a space of rectangular cross section bounded, in vertical planes, by the lines 66, 67, 78 and 79 in FIG. 1. By the described horizontal and vertical deflection of the laser beam, a single one of the individual holograms on the hologram matrix 34 is illuminated. The individual character stored in the illuminated hologram is imaged at the image plane 40 for viewing or utilization by means such as those shown in FIG. 1.

The optical deflection system of the invention has the advantage of being capable of construction in very compact form. The rotatable galvanometer mirrors 16 and 30 are positioned conveniently close together in a form of construction commonly employed in multi-trace recording galvanometer units. The condensing lens 18 is positioned at its focal length distance from the galvanometer mirrors 16 and 30. The prism 20 receives and reflects beams along collimated paths, and therefore the prism 20 may be positioned at any convenient distance from the condensing lens 18. The pricise alignment of the various optical elements is most easily accomplished when the prism 20 is displaced from the condensing lens 18 by the focal length distance of the condensing lens 18. However, by following a slightly more complex alignment procedure, the prism 20 may be positioned very close to the condensing lens 18, and both may, in fact, be constructed from a single piece of optical glass.

The condensing lens 32 used to collimate the horizontally and vertically deflected beam toward the hologram matrix 34 is included in the system only if the hologram matrix 34 was initially created using light along the opposite collimated path direction 46. If desired, for additional compactness of construction, the condensing lens 32 may be omitted and the hologram matrix 34 may be positioned in its place. In this case, the individual holograms on the hologram matrix 34 should each be initially created using light directed from directions precisely opposite the directions of respective utilization beams from rotatable mirror 30.

The random-access optical character selection system of the invention accomplishes a great deal with relatively few component parts. That is, when an individual hologram in the matrix 34 is illuminated, and regardless of the position of the individual hologram on the matrix 34, the corresponding character is always imaged at the same location 40 in space. There is no need for any further optical means to direct a selected character image to a single stationary utilization location.

The system of the invention is capable of a high operating speed in randomly accessing successive individual holograms in the matrix 34. The speed of operation is greater than might be expected in view of the fact that the galvanometer mirrors 16 and 30 have inertia and must be moved mechanically. However, the image presented at 40 of a selected individual hologram is perfectly stationary despite the existence of some jiggling or hunting of the rotatable mirrors 16 and 30. The image created at 40 is stable and useful so long as any substantial part of the individual hologram is illuminated by the deflected laser beam. Therefore, a much higher speed of random access operation is feasible using galvanometer mirror movements than might seem possible.

Another important advantage of the system of the invention is that it can utilize a conveniently available, and room-temperature-operated, gas laser producing a very intense continuous laser beam having an almost constant cross sectional area when transmitted over distances involved in the system. Further, the spectral characteristics of available lasers of this type are particularly well suited for the image-sensitive screens at 40 of available utilization devices. Also, the intensity of the image at 40 is fully adequate for existing high-speed utilization devices 42.

What is claimed is:

1. In a photocomposing apparatus or the like, means to create an image of any selected one of many alphanumeric or graphic characters at a fixed location in space, comprising a laser beam source directing a light beam through a path including, in the order named, a first rotatable mirror, a condensing lens, a right-angle deflection-rotating prism, back through said condensing lens, a second rotatable mirror, a hologram matrix of individual character-representing holograms, and stationary means positioned to receive the image of a character from any illuminated individual hologram.

2. Apparatus as defined in claim 1 wherein said rotatable mirrors are mounted side-by-side with parallel axes of rotation and with effective mirror surfaces displaced along a 45-degree diagonal, and wherein said prism is mounted with its axis parallel to said 45-degree diagonal.

3. In a photocomposing apparatus or the like, means to create an image of any selected one of many alphanumeric or graphic characters at a fixed location in space, comprising a laser beam source directing a light beam through a path including, in the order named, a first galvanometer mirror, a condensing lens, a right-angle deflection-rotating prism, back through said condensing lens, a second galvanometer mirror, and a halogram matrix of individual character-representing holograms arranged in rows and columns, said first and second galvanometer mirrors being mounted side-by-side with parallel axes of rotation and with effective mirror surfaces displaced along a 45-degree diagonal, said prism being mounted with its axis parallel with said 45-degree diagonal, said condensing lens being located at its focal length distance from said mirrors, whereby said laser beam can be horizontally and vertically deflected to any selected character-representing hologram of said hologram matrix, and stationary planar means positioned off to the side of the beam path through said hologram matrix to receive on its full surface a first-order reconstructed image resulting from illumination of any selected corresponding one of said individual holograms.

4. An optical scanner comprising
   a light beam source producing a narrow beam of light,
   a right-angle deflection-rotating prism having two reflecting surfaces at right-angles to each other and having an axis parallel to both of said surfaces,
   a matrix of graphic information,
   a first rotatable mirror positioned to reflect the light beam from said source into said right-angle prism, from which the light beam is returned along a substantially parallel path, and
   a second rotatable mirror positioned to reflect the light beam from said prism to said matrix of graphic information,
   said first and second rotatable mirrors being positioned in a side-by-side offset fashion with parallel axes of rotation and with effective mirror surfaces displaced along a 45-degree diagonal relative to the parallel axes of rotation, said right-angle prism being positioned with its axis parallel to said 45-degree diagonal.

5. An optical scanner as defined in claim 4 and in addition, a condensing lens in the paths between said side-by-side mirrors and said prism.

6. An optical scanner as defined in claim 5 wherein said light beam source is a laser beam source, and wherein said matrix of graphic information is a matrix of individual holograms.

7. An optical scanner as defined in claim 4 wherein said light beam source is a laser beam source, and wherein said matrix of graphic information is a matrix of individual holograms.

8. An optical scanner as defined in claim 7, and in addition, a stationary planar means positioned off to the side of the laser beam path through said holograms matrix to receive on its full surface a first-order reconstructed image resulting from illumination of any selected corresponding ones of said individual holograms.

References Cited
UNITED STATES PATENTS
2,600,168  6/1952  Klyce _____ 95—4.5

JOHN M. HORAN, Primary Examiner

U.S. Cl. X.R.
178—15, 23, 30; 340—324; 350—285